(12) United States Patent
Allison et al.

(10) Patent No.: US 10,976,885 B2
(45) Date of Patent: Apr. 13, 2021

(54) SYSTEMS AND METHODS FOR ELECTRONIC SIGNATURE

(71) Applicant: Zillow, Inc., Seattle, WA (US)

(72) Inventors: Gregory Austin Allison, Cincinnati, OH (US); Justin Y. Hu, Talmage, CA (US)

(73) Assignee: Zillow, Inc., Seattle, WA (US)

( * ) Notice: Subject to any disclaimer, the term of this patent is extended or adjusted under 35 U.S.C. 154(b) by 78 days.

(21) Appl. No.: 15/436,617

(22) Filed: Feb. 17, 2017

(65) Prior Publication Data

US 2017/0322681 A1 Nov. 9, 2017

Related U.S. Application Data

(63) Continuation of application No. 14/243,128, filed on Apr. 2, 2014, now Pat. No. 9,575,622.

(60) Provisional application No. 61/807,471, filed on Apr. 2, 2013.

(51) Int. Cl.
*G06F 3/0481* (2013.01)
*H04L 9/32* (2006.01)

(52) U.S. Cl.
CPC ........ *G06F 3/0481* (2013.01); *G06F 3/04817* (2013.01); *H04L 9/3247* (2013.01)

(58) Field of Classification Search
CPC ... G06F 3/0481; G06F 3/04817; H04L 9/3247
See application file for complete search history.

(56) References Cited

U.S. PATENT DOCUMENTS

| | | | |
|---|---|---|---|
| 4,747,093 A | 5/1988 | Benne et al. |
| 4,870,576 A | 9/1989 | Tornetta |
| 5,032,989 A | 7/1991 | Tornetta |
| D321,903 S | 11/1991 | Chepaitis |
| 5,317,646 A | 5/1994 | Sang, Jr. et al. |
| 5,325,297 A | 6/1994 | Bird et al. |
| 5,361,201 A | 11/1994 | Jost |
| 5,392,388 A | 2/1995 | Gibson |
| 5,526,341 A | 6/1996 | Shiba et al. |
| 5,623,655 A | 4/1997 | Chisaka |
| 5,680,305 A | 10/1997 | Apgar |
| 5,754,850 A | 5/1998 | Janssen |

(Continued)

FOREIGN PATENT DOCUMENTS

| | | |
|---|---|---|
| KR | 1020020092595 | 12/2002 |
| KR | 1020070059931 | 6/2007 |

(Continued)

OTHER PUBLICATIONS

"E-Signature Custom Signature Fonts", http:/www.e-signature.com/en/prod01_en.htm, Mar. 28, 2006, hereinafter "Font".*

(Continued)

*Primary Examiner* — Matthew Ell
(74) *Attorney, Agent, or Firm* — Perkins Coie LLP

(57) ABSTRACT

Systems and methods facilitating electronic signatures (E-Signatures) are provided. Multiple E-Signatures can be provided to electronic documents through a simple command, such as a selection of a single graphical element. A user's signatures, initials, or other identifier can be added to the electronic document in the appropriate fields upon receipt of the appropriate command or command set from the user.

24 Claims, 7 Drawing Sheets

(56) References Cited

U.S. PATENT DOCUMENTS

| | | |
|---|---|---|
| D396,455 S | 7/1998 | Bier |
| 5,848,187 A | 12/1998 | Bricklin et al. |
| 5,943,679 A | 8/1999 | Niles et al. |
| 5,946,667 A | 8/1999 | Tull |
| 6,032,123 A | 2/2000 | Jameson |
| 6,067,831 A | 5/2000 | Amborn et al. |
| 6,289,460 B1 | 9/2001 | Hajmiragha |
| 6,401,070 B1 | 6/2002 | McManus |
| 6,519,618 B1 | 2/2003 | Snyder |
| D474,197 S | 5/2003 | Nguyen |
| D477,242 S | 7/2003 | Laats |
| 6,594,633 B1 | 7/2003 | Broerman |
| 6,609,109 B1 | 8/2003 | Bradley |
| 6,609,118 B1 | 8/2003 | Khedkar |
| 6,636,803 B1 | 10/2003 | Hartz |
| 6,651,217 B1 | 11/2003 | Kennedy et al. |
| 6,684,196 B1 | 1/2004 | Mini et al. |
| 6,711,554 B1 | 3/2004 | Salzmann et al. |
| 6,810,404 B1 | 10/2004 | Ferguson et al. |
| 6,898,317 B2 | 5/2005 | Struble et al. |
| 6,944,648 B2 | 9/2005 | Cochran et al. |
| D521,019 S | 5/2006 | Ording |
| 7,143,290 B1 | 11/2006 | Ginter et al. |
| D536,343 S | 2/2007 | Fong et al. |
| D544,495 S | 6/2007 | Evans et al. |
| 7,228,319 B1 | 6/2007 | Fuchs |
| D554,660 S | 11/2007 | Hoover et al. |
| D554,661 S | 11/2007 | Hoover et al. |
| 7,299,408 B1 | 11/2007 | Daconta et al. |
| 7,334,187 B1 | 2/2008 | Stanciu et al. |
| D566,722 S | 4/2008 | Jackson |
| 7,376,891 B2 | 5/2008 | Hitchcock et al. |
| D572,726 S | 7/2008 | Guimaraes et al. |
| 7,475,333 B2 | 1/2009 | Otter et al. |
| D591,305 S | 4/2009 | Shimoda |
| 7,543,228 B2 | 6/2009 | Kelkar et al. |
| D595,727 S | 7/2009 | Koes et al. |
| D599,284 S | 9/2009 | Misumi |
| D599,814 S | 9/2009 | Ogura et al. |
| D601,159 S | 9/2009 | Truelove et al. |
| 7,692,635 B2 | 4/2010 | Iwamura |
| 7,702,999 B1 | 4/2010 | Sperr et al. |
| D615,551 S | 5/2010 | Arnell |
| 7,725,359 B1 | 5/2010 | Katzfey et al. |
| D619,593 S | 7/2010 | Fujioka et al. |
| 7,765,125 B1 | 7/2010 | An |
| D624,557 S | 9/2010 | Allen et al. |
| 7,818,219 B2 | 10/2010 | Klivington et al. |
| 7,822,691 B1 | 10/2010 | Kuo |
| 7,917,842 B2 | 3/2011 | Garrison |
| 7,934,098 B1 * | 4/2011 | Hahn .............. G06F 21/64 713/176 |
| 7,945,496 B2 | 5/2011 | Trott |
| 7,970,684 B1 | 6/2011 | Benda |
| 7,987,117 B2 | 7/2011 | Mozley |
| D643,047 S | 8/2011 | Guss et al. |
| D644,243 S | 8/2011 | Matas |
| D644,654 S | 9/2011 | Maitlen et al. |
| D650,790 S | 12/2011 | Jeans et al. |
| D650,807 S | 12/2011 | Impas et al. |
| D652,426 S | 1/2012 | Anzures |
| D654,925 S | 2/2012 | Nishizawa et al. |
| 8,145,909 B1 * | 3/2012 | Agrawal .......... G06F 21/6209 713/176 |
| D656,954 S | 4/2012 | Arnold et al. |
| 8,151,209 B2 | 4/2012 | Law et al. |
| D659,711 S | 5/2012 | Guss et al. |
| D660,317 S | 5/2012 | Jesberger |
| D664,205 S | 7/2012 | Xu et al. |
| D665,161 S | 8/2012 | Leifeld et al. |
| D665,162 S | 8/2012 | Leifeld et al. |
| D665,163 S | 8/2012 | Leifeld et al. |
| D665,421 S | 8/2012 | Morrow et al. |
| 8,239,496 B2 | 8/2012 | Peterson et al. |
| D667,429 S | 9/2012 | Wujcik et al. |
| D669,497 S | 10/2012 | Lee et al. |
| D669,499 S | 10/2012 | Gardner et al. |
| D671,558 S | 11/2012 | Anzures et al. |
| D676,060 S | 2/2013 | Frost et al. |
| D676,457 S | 2/2013 | Frost et al. |
| 8,375,016 B2 | 2/2013 | Allison et al. |
| D677,180 S | 3/2013 | Plitkins et al. |
| D682,305 S | 5/2013 | Mierau et al. |
| D682,882 S | 5/2013 | Cahill et al. |
| D683,757 S | 6/2013 | Phelan |
| D684,185 S | 6/2013 | van Dongen et al. |
| D684,990 S | 6/2013 | Walsh |
| D687,046 S | 7/2013 | Plitkins et al. |
| D687,057 S | 7/2013 | Plitkins |
| D687,460 S | 8/2013 | Tyler et al. |
| D687,851 S | 8/2013 | Sloo et al. |
| D689,505 S | 9/2013 | Convay et al. |
| D690,717 S | 10/2013 | Thomsen et al. |
| D690,718 S | 10/2013 | Thomsen et al. |
| D691,629 S | 10/2013 | Matas et al. |
| D692,444 S | 10/2013 | Lee et al. |
| 8,583,562 B1 | 11/2013 | McDaniel |
| 8,589,191 B1 | 11/2013 | Menzies |
| D696,265 S | 12/2013 | d'Amore et al. |
| D697,076 S | 1/2014 | Oda et al. |
| D697,518 S | 1/2014 | Thomsen et al. |
| D697,519 S | 1/2014 | Thomsen et al. |
| D697,935 S | 1/2014 | Lee et al. |
| D698,363 S | 1/2014 | Asai |
| D699,248 S | 2/2014 | Pearson et al. |
| D699,250 S | 2/2014 | Fujii et al. |
| D699,741 S | 2/2014 | Wantland et al. |
| D699,750 S | 2/2014 | Pearson et al. |
| D700,207 S | 2/2014 | Pearson et al. |
| 8,650,067 B1 | 2/2014 | Moss |
| 8,683,315 B2 | 3/2014 | Stover |
| D703,683 S | 4/2014 | Skidgel |
| D704,204 S | 5/2014 | Rydenhag |
| D705,263 S | 5/2014 | Hartley |
| D705,808 S | 5/2014 | Anzures et al. |
| D706,814 S | 6/2014 | Phelan |
| D707,705 S | 6/2014 | Folken et al. |
| D708,203 S | 7/2014 | Johnson |
| D708,221 S | 7/2014 | Danton et al. |
| D708,226 S | 7/2014 | Takata et al. |
| D709,917 S | 7/2014 | Faulkner et al. |
| D711,421 S | 8/2014 | Bautista |
| D715,313 S | 10/2014 | Hontz, Jr. |
| D715,322 S | 10/2014 | Sakata |
| D716,325 S | 10/2014 | Brudnicki |
| D717,334 S | 11/2014 | Sakuma |
| D717,335 S | 11/2014 | Sakuma |
| D717,681 S | 11/2014 | Shail et al. |
| D717,822 S | 11/2014 | Brotman et al. |
| D717,823 S | 11/2014 | Brotman et al. |
| D718,325 S | 11/2014 | Schoger et al. |
| D721,090 S | 1/2015 | Hong et al. |
| D721,093 S | 1/2015 | Pereira |
| 9,330,375 B2 | 5/2016 | Allison et al. |
| 9,575,622 B1 | 2/2017 | Allison et al. |
| 9,785,627 B2 | 10/2017 | Campanelli et al. |
| 10,062,110 B1 | 8/2018 | Tatang |
| 2001/0039506 A1 | 11/2001 | Robbins |
| 2002/0035520 A1 | 3/2002 | Weiss |
| 2002/0065739 A1 | 5/2002 | Florance |
| 2002/0069358 A1 | 6/2002 | Silvester |
| 2002/0082849 A1 | 6/2002 | Tenorio |
| 2002/0087389 A1 | 7/2002 | Sklarz |
| 2002/0099733 A1 | 7/2002 | Teruuchi et al. |
| 2002/0129656 A1 | 9/2002 | Tsuzuki |
| 2002/0135440 A1 | 9/2002 | Ryhanen |
| 2002/0184485 A1 | 12/2002 | Dray et al. |
| 2003/0046639 A1 | 3/2003 | Fai et al. |
| 2003/0056100 A1 | 3/2003 | Beatson |
| 2003/0101063 A1 | 5/2003 | Sexton |
| 2003/0121008 A1 | 6/2003 | Tischer |
| 2003/0191719 A1 | 10/2003 | Ginter et al. |
| 2003/0220807 A1 | 11/2003 | Hoffmna |
| 2003/0227482 A1 | 12/2003 | Bach et al. |

(56) References Cited

U.S. PATENT DOCUMENTS

| | | |
|---|---|---|
| 2003/0229552 A1 | 12/2003 | Lebaric |
| 2003/0236832 A1 | 12/2003 | McIntyre et al. |
| 2004/0098284 A1 | 5/2004 | Petito et al. |
| 2004/0128215 A1 | 7/2004 | Florance |
| 2004/0133493 A1 | 7/2004 | Ford et al. |
| 2004/0181749 A1 | 9/2004 | Chellapilla |
| 2004/0205534 A1 | 10/2004 | Koelle |
| 2004/0205653 A1 | 10/2004 | Hadfield et al. |
| 2004/0220885 A1 | 11/2004 | Salzmann et al. |
| 2004/0225884 A1 | 11/2004 | Lorenzini et al. |
| 2004/0255114 A1 | 12/2004 | Lee et al. |
| 2005/0086596 A1 | 4/2005 | Koch et al. |
| 2005/0108025 A1 | 5/2005 | Cagan |
| 2005/0177389 A1* | 8/2005 | Rakowicz .......... G06Q 20/3829 705/75 |
| 2005/0192930 A1 | 9/2005 | Hightower et al. |
| 2005/0251535 A1 | 11/2005 | Theissen et al. |
| 2005/0273417 A1 | 12/2005 | Budish |
| 2006/0007189 A1 | 1/2006 | Gaines |
| 2006/0015435 A1 | 1/2006 | Nathanson |
| 2006/0026032 A1 | 2/2006 | Higgins |
| 2006/0026136 A1 | 2/2006 | Drucker et al. |
| 2006/0069599 A1 | 3/2006 | Hatoun et al. |
| 2006/0085311 A1 | 4/2006 | Hoerle et al. |
| 2006/0116952 A1 | 6/2006 | Orfano |
| 2006/0149567 A1 | 7/2006 | Muller et al. |
| 2006/0190810 A1 | 8/2006 | Piersol |
| 2006/0200308 A1 | 9/2006 | Arutunian |
| 2006/0259440 A1 | 11/2006 | Leake et al. |
| 2007/0005383 A1 | 1/2007 | Kasower |
| 2007/0009158 A1 | 1/2007 | Geva et al. |
| 2007/0022141 A1 | 1/2007 | Singleton |
| 2007/0038533 A1 | 2/2007 | Huff |
| 2007/0088958 A1 | 4/2007 | Qa'lm-maqami |
| 2007/0118391 A1 | 5/2007 | Malaney et al. |
| 2007/0136361 A1 | 6/2007 | Lee et al. |
| 2007/0136679 A1 | 6/2007 | Yang |
| 2007/0168382 A1 | 7/2007 | Tillberg et al. |
| 2007/0179881 A1 | 8/2007 | Lord |
| 2007/0186157 A1 | 8/2007 | Walker |
| 2008/0091700 A1 | 4/2008 | Brotherson et al. |
| 2008/0091954 A1 | 4/2008 | Morris et al. |
| 2008/0097777 A1 | 4/2008 | Rielo |
| 2008/0133319 A1 | 6/2008 | Adiga |
| 2008/0154740 A1 | 6/2008 | Lee |
| 2008/0155391 A1 | 6/2008 | Sattler et al. |
| 2008/0167941 A1 | 7/2008 | Kagarlis |
| 2008/0209313 A1 | 8/2008 | Gonser |
| 2008/0260287 A1 | 10/2008 | Berryman et al. |
| 2008/0262833 A1 | 10/2008 | Kano et al. |
| 2008/0288312 A1 | 11/2008 | Miles |
| 2008/0301064 A1 | 12/2008 | Burns |
| 2008/0319890 A1 | 12/2008 | Urbanski et al. |
| 2009/0003588 A1 | 1/2009 | Ross |
| 2009/0006241 A1 | 1/2009 | Zhao et al. |
| 2009/0018975 A1 | 1/2009 | Geltner |
| 2009/0024912 A1 | 1/2009 | McCabe et al. |
| 2009/0025087 A1* | 1/2009 | Peirson, Jr. ............. G06Q 10/00 726/27 |
| 2009/0029786 A1 | 1/2009 | Chen et al. |
| 2009/0043685 A1 | 2/2009 | Benjamin |
| 2009/0109455 A1 | 4/2009 | Smith et al. |
| 2009/0173552 A1 | 7/2009 | Elder et al. |
| 2009/0226090 A1 | 9/2009 | Okita |
| 2009/0320035 A1 | 12/2009 | Ahlgren et al. |
| 2010/0011286 A1* | 1/2010 | Isoda ...................... G06T 11/00 715/246 |
| 2010/0023379 A1 | 1/2010 | Rappaport |
| 2010/0057538 A1 | 3/2010 | Hardman |
| 2010/0076903 A1* | 3/2010 | Klingenberg .......... G06Q 10/08 705/333 |
| 2010/0131331 A1 | 5/2010 | Ginsburg |
| 2010/0161460 A1 | 6/2010 | Vroom et al. |
| 2010/0161498 A1 | 6/2010 | Walker |
| 2010/0235727 A1* | 9/2010 | Ashton ................... G06Q 10/10 715/253 |
| 2010/0287260 A1 | 11/2010 | Peterson et al. |
| 2011/0026828 A1 | 2/2011 | Balasubramanian et al. |
| 2011/0178905 A1 | 7/2011 | Kagarlis |
| 2011/0199631 A1 | 8/2011 | Healy |
| 2011/0258535 A1 | 10/2011 | Adler, III et al. |
| 2011/0270766 A1 | 11/2011 | Ramakrishnan et al. |
| 2011/0271173 A1 | 11/2011 | Ait-Mokhar et al. |
| 2011/0276395 A1 | 11/2011 | Gaton et al. |
| 2011/0276875 A1 | 11/2011 | McCabe et al. |
| 2011/0313945 A1 | 12/2011 | Callan |
| 2011/0314371 A1 | 12/2011 | Peterson et al. |
| 2012/0063684 A1 | 3/2012 | Denoue et al. |
| 2012/0066061 A1 | 3/2012 | Clement |
| 2012/0096383 A1 | 4/2012 | Sakamoto et al. |
| 2012/0102002 A1 | 4/2012 | Sathyanarayana |
| 2012/0144285 A1 | 6/2012 | Bach et al. |
| 2012/0209875 A1 | 8/2012 | Hintze |
| 2012/0254045 A1 | 10/2012 | Orfano |
| 2012/0254156 A1 | 10/2012 | Rao |
| 2012/0297277 A1 | 11/2012 | King et al. |
| 2012/0297301 A1 | 11/2012 | Mahoney et al. |
| 2013/0024788 A1 | 1/2013 | Olsen et al. |
| 2013/0036347 A1 | 2/2013 | Eftekhari et al. |
| 2013/0086624 A1 | 4/2013 | Powell |
| 2013/0096819 A1 | 4/2013 | Tarnok |
| 2013/0097478 A1 | 4/2013 | Allison et al. |
| 2013/0097480 A1 | 4/2013 | Allison et al. |
| 2013/0185753 A1 | 7/2013 | Kliot |
| 2013/0211945 A1 | 8/2013 | Po-Ching |
| 2013/0238965 A1 | 9/2013 | Barrus |
| 2013/0297442 A1 | 11/2013 | Simons |
| 2013/0317939 A1 | 11/2013 | Urbanski |
| 2013/0325623 A1 | 12/2013 | Balduf |
| 2013/0325665 A1 | 12/2013 | Shaffer |
| 2013/0346151 A1 | 12/2013 | Bleakley |
| 2014/0033088 A1 | 1/2014 | Shaver |
| 2014/0164255 A1 | 6/2014 | Daly |
| 2014/0164260 A1 | 6/2014 | Spieckerman |
| 2014/0229543 A1 | 8/2014 | Allison et al. |
| 2014/0236751 A1 | 8/2014 | Bloomfield |
| 2015/0081497 A1 | 3/2015 | Patel |
| 2015/0242747 A1 | 8/2015 | Packes |
| 2015/0317701 A1 | 11/2015 | Thomas |
| 2015/0332371 A1 | 11/2015 | Lomas |
| 2016/0232629 A1 | 8/2016 | Allison et al. |
| 2018/0225593 A1 | 8/2018 | Cozine |

FOREIGN PATENT DOCUMENTS

| | | |
|---|---|---|
| WO | WO-1996007156 A1 | 3/1996 |
| WO | 0106416 A2 | 1/2001 |
| WO | WO-2009012475 A1 | 1/2009 |
| WO | WO-2010105262 A1 | 9/2010 |
| WO | WO-2010151630 A2 | 12/2010 |
| WO | WO-2011056819 A1 | 5/2011 |
| WO | WO-2011139563 A2 | 11/2011 |

OTHER PUBLICATIONS

Adobe Acrobat DC, "Convert existing forms to fillable PDFs," 2015, 12 pages.

Adobe Acrobat XI, "Convert an existing form into a fillable PDF form with Adobe Acrobat XI," Quick Start Guide, 2012, 1 page.

International Search Report dated Feb. 22, 2010 for Application No. PCT/US2009/061012.

International Search Report, PCT/US2010/039768, dated Feb. 23, 2011, 4 pages.

International Search Report, PCT/US2011/033194, dated Nov. 28, 2011, 4 pages.

International Search Report, PCT/US2011/040218, dated Feb. 17, 2012, 3 pages.

International Search Report; PCT/US2012/046386; dated Oct. 5, 2012; 2 pages.

Nuance, Power PDF How To: Create Fillable PDF Form, "How to get started, and get more out of your PDF's," 4 pages.

(56) References Cited

OTHER PUBLICATIONS

Written Opinion of the International Searching Authority; PCT/US2008/070566, dated Feb. 19, 2009, 4 pages.
Written Opinion of the International Searching Authority; PCT/US2012/046386; dated Oct. 5, 2012; 7 pages.
U.S. Appl. No. 14/620,262, of Allison et al., filed Feb. 12, 2015.
U.S. Appl. No. 14/842,267, of Allison et al., filed Sep. 1, 2015.
U.S. Appl. No. 15/135,398, of Allison et al., filed Apr. 21, 2016.
Non-Final Office Action for U.S. Appl. No. 14/620,262; dated Dec. 31, 2018; 18 pages.
FHFA, "House Price Index Frequently Asked Questions," Federal Housing Finance Agency, Aug. 2018, available at https://www.fhfa.gov/Media/PublicAffairs/Pages/House-Price-Index-Frequently-Asked-Questions.aspx (accessed Oct. 29, 2018). (Year: 2018).
Final Office Action for U.S. Appl. No. 14/177,656; dated Oct. 18, 2018; 30 pages.
Final Office Action for U.S. Appl. No. 14/177,656; dated Dec. 28, 2017; 25 pages.
Final Office Action for U.S. Appl. No. 14/620,262; dated Jun. 20, 2018; 18 pages.
Final Office Action for U.S. Appl. No. 14/842,267; dated May 21, 2018; 25 pages.
Kiplinger Personal Finance, "Before Submitting a Home Offer, Make Sure All Bases Are Covered," Jan. 2015, available at https://www.kiplinger.com/article/real-estate/T029-COOO-SOO 1-6-ways-to-stage-your-home-for-less-than-1-000 .html (access Oct. 28, 2018).
Non-Final Office Action for U.S. Appl. No. 13/547,120; dated Nov. 1, 2017; 14 pages.
Non-Final Office Action for U.S. Appl. No. 14/177,656; dated Apr. 4, 2018; 28 pages.
Non-Final Office Action for U.S. Appl. No. 14/620,262; dated Dec. 7, 2017; 18 pages.
Non-Final Office Action for U.S. Appl. No. 15/131,747; dated Sep. 7, 2018; 38 pages.
Non-Final Office Action for U.S. Appl. No. 15/131,747; dated Feb. 5, 2018; 38 pages.
Non-Final Office Action for U.S. Appl. No. 15/135,398; dated Nov. 7, 2018; 99 pages.
Notice of Allowance for U.S. Appl. No. 13/547,120; dated Jun. 28, 2018; 10 pages.
U.S. Appl. No. 16/135,282 for Allison, filed Sep. 19, 2018.
Final Office Action for U.S. Appl. No. 15/131,747; dated Jun. 14, 2019; 14 pages.
Final Office Action for U.S. Appl. No. 15/135,398; dated Jun. 10, 2019; 99 pages.
Non-Final Office Action for U.S. Appl. No. 14/177,656; dated Apr. 19, 2019; 31 pages.
Non-Final Office Action for U.S. Appl. No. 14/842,267; dated Jun. 17, 2019; 30 pages.
Non-Final Office Action for U.S. Appl. No. 16/135,282; dated Aug. 22, 2019; 14 pages.
Non-Final Office Action for U.S. Appl. No. 15/131,747; dated Jan. 9, 2020; 37 pages.
Non-Final Office Action for U.S. Appl. No. 15/135,398; dated Dec. 26, 2019; 90 pages.
Corrected Notice of Allowance for U.S. Appl. No. 14/620,262; dated Dec. 23, 2019; 12 pages.
Final Office Action for U.S. Appl. No. 14/842,267; dated Sep. 19, 2019; 33 pages.
Notice of Allowance for U.S. Appl. No. 14/620,262; dated Sep. 23, 2019; 12 pages.
Notice of Allowance for U.S. Appl. No. 14/177,656; dated Apr. 17, 2020; 9 pages.
Notice of Allowance for U.S. Appl. No. 14/842,267; dated Apr. 1, 2020; 14 pages.
Final Office Action for U.S. Appl. No. 16/135,282; dated Feb. 6, 2020; 15 pages.
Final Office Action for U.S. Appl. No. 15/135,398; dated May 15, 2020; 94 pages.
Final Office Action for U.S. Appl. No. 15/131,747; dated Jul. 10, 2020; 43 pages.
Notice of Allowance for U.S. Appl. No. 14/177,656; dated Jun. 24, 2020; 9 pages.
U.S. Appl. No. 16/911,122 for Allison, filed Jun. 24, 2020.

\* cited by examiner

SYSTEMS AND METHODS FOR ELECTRONIC SIGNATURE

CROSS-REFERENCE TO RELATED APPLICATION(S)

This application is a continuation of U.S. pat. app. Ser. No. 14/243,128, (now U.S. Pat. No. 9,575,622), filed on Apr. 2, 2014, entitled "SYSTEMS AND METHODS FOR ELECTRONIC SIGNATURE," which claims the benefit of U.S. Provisional Patent Application No. 61/807,471, filed on Apr. 2, 2013, entitled "SYSTEMS AND METHODS FOR ELECTRONIC SIGNATURE," the disclosures of which are hereby incorporated by reference herein in their entireties.

TECHNICAL FIELD

The systems and methods described below relate generally to the field of electronic content, and, more specifically, the systems and methods described below relate to the field of electronically signing electronic content.

BACKGROUND

Much of the business world has shifted toward online business practices. Included in these practices are the execution of contracts and other documents using electronic signatures, sometimes referred to as E-Signatures. Generally, the use of E-Signatures can facilitate efficient transactions supported by an electronic audit trail. In the context of a negotiation, for example, the employment of E-Signatures can replace the need for a party to print and then fax or scan the signed document to the other party. In some transactions, such as complex or document intensive transactions, a party may need to provide a high number of E-Signatures to a single document or across a collection of documents.

DETAILED DESCRIPTION

Figure 1:
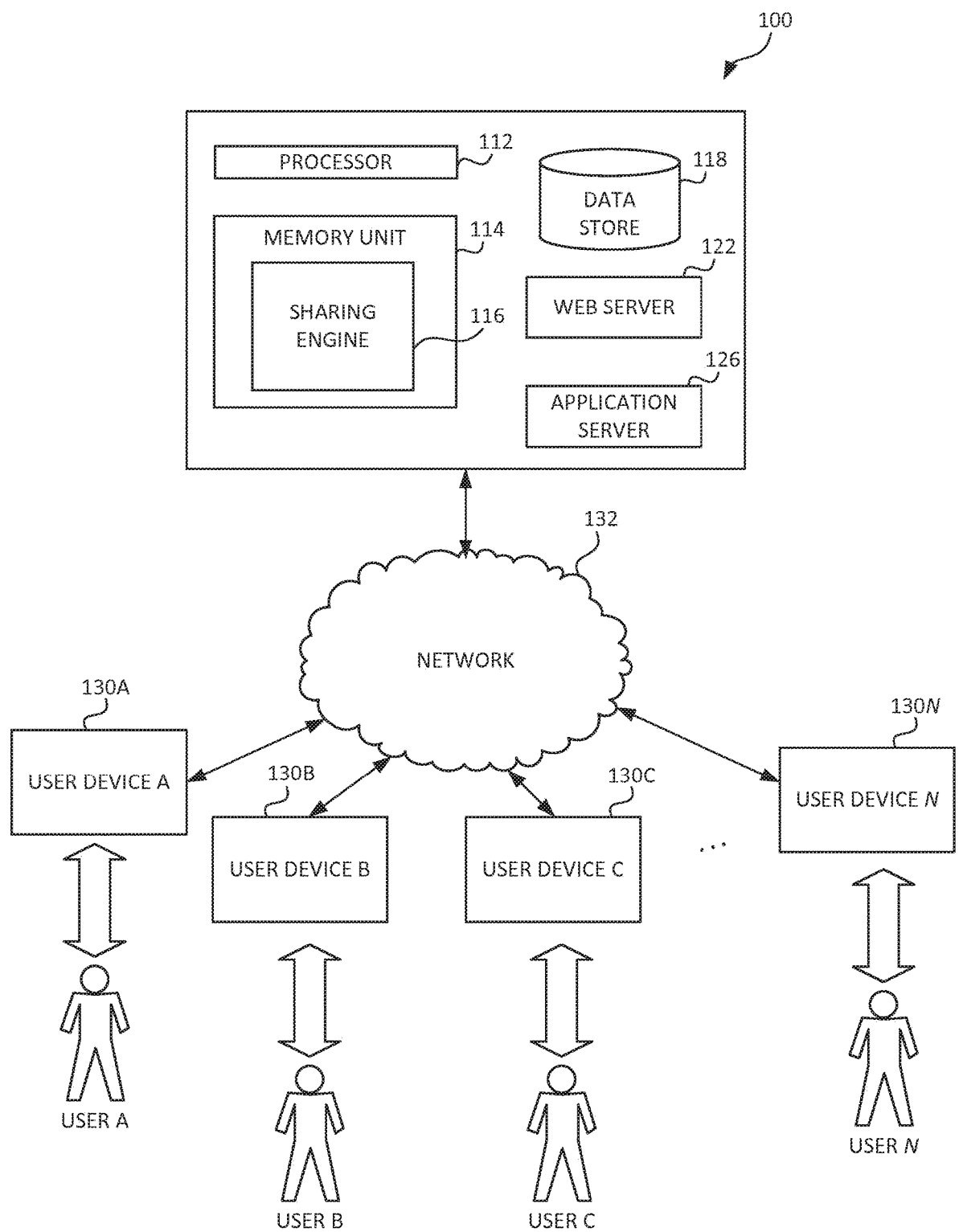
FIG. 1 depicts an example electronic document sharing system.

The systems and methods disclosed herein are described in detail by way of examples and with reference to the figures. It will be appreciated that modifications to disclosed and described examples, arrangements, configurations, components, elements, apparatuses, methods, systems, etc. can be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems, apparatus, and methods disclosed herein generally relate to the electronic signing (or "E-Signing") of electronic content, with selected examples disclosed and described in detail with reference made to FIGS. 1-7. The apparatuses, devices, systems and methods disclosed and described herein can be used to E-Sign a variety of electronic content, such as electronic transactional documents. Those of ordinary skill in the art will recognize that any other electronic content can be E-Signed using the systems and methods described herein. Throughout this document, reference to particular types of electronic content is merely for pedagogical purposes and is not intended to limit the disclosure to specific embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores and computing instructions in any electronic format, firmware, and embedded software. The terms information and data are used expansively and includes a wide variety of electronic information, including but not limited to machine-executable or machine-interpretable instructions; content such as text, video data, and audio data, among others; and various codes or flags. The terms information, data, and content are sometimes used interchangeably when permitted by context. It should be noted that although for clarity and to aid in understanding some examples discussed below might describe specific features or functions as part of a specific component or module, or as occurring at a specific layer of a computing device (for example, a hardware layer, operating system layer, or application layer), those features or functions can be implemented as part of a different component or module or at a different layer.

The examples discussed below are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods can be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

The figures and accompanying detailed description generally describe an application, or collection of applications, that includes computer executable instructions capable of executing on a computing platform such as a desktop, laptop, tablet, mobile computing device, or other suitable hardware. The application can include software modules, processes, application programming interfaces or APIs, drivers, helper applications such as plug-ins, databases such as search and query databases, and other types of software modules or computer programming as would be understood in the art.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics can be combined in any suitable manner in one or more embodiments.

The presently disclosed embodiments are generally directed to systems for electronically signing documents (which can be referred to herein as "E-Signing" or an "E-Signature"). In some embodiments, the documents are presented in an online environment, such as via a web browser executing on a computing device. The documents can be part of an online transaction, such as a real estate transaction, or any other type of transaction or occurrence in which a user signs and/or initials using an E-Signing process. The computing device can be any suitable device, such as mobile communications devices such as smartphones and the like.

By way of example, in the context of real estate transactions facilitated with electronic documents, a buyer may have to review a relatively large volume of documents. Each document electronically presented to the buyer may have a number of fields seeking either the buyer's electronic initials or the buyer's electronic signature. Stepping through the entire volume of documents and individually E-signing each field can be labor and time intensive. The systems and methods described in more detail below generally relate to giving the buyer (or any other type of user) the ability to sign and/or initial a plurality of fields on a single electronic document or a plurality of electronic documents through relatively simple interactions with the system. For example, in certain embodiments, a processing system can present an electronic document to the user seeking a large number of electronic signatures from the user. By way of a single interaction with the system, such as a "single mouse click" or other analogous operation, the user can populate all of the fields in a document with the user's digital signature and submit the signed document to the processing system. In other embodiments, a tiered or staged approach can be used, wherein a first interaction populates the fields with electronic signatures and a second interaction submits the signatures to the processing system. In yet other embodiments, different variations of signature review and submission can be used. For example, for scenarios in which a user is E-Signing a plurality of different documents, a first interaction can populate the signature fields in each of the documents. The user then reviews each document with the populated E-Signatures and separately submits that particular document to the processing system using a particular interaction, such as selecting a "submit this signed document" button on a user interface.

Certain embodiments of the systems and methods described herein can be used during an online transaction that is facilitated by an online or virtual transaction platform, or any other suitable type of electronic platform. In the real estate context, such transactions can include negotiations and the exchanging terms sheets, contracts, or other content conveyed to various users in electronic format that request a user's E-Signature. Other fields of use include, but are not limited to, lending, insurance, finance, and any other field or endeavor in which E-Signatures are utilized.

Referring now to FIG. 1, one example embodiment of the present disclosure can comprise a computer-based electronic document sharing system 100 that generally controls the sharing of electronic content. The electronic document sharing system 100 can be a component of, or otherwise associated with, other computer-based systems, such as y ems for facilitating online transactions, social networking systems, payment platforms, and so forth. In one example embodiment, the electronic document sharing system 100 is associated with the interactive real estate contract and negotiation tool described in U.S. Pat. App. Pub. No. 2010/0100522, the entirety of which is incorporated herein by reference. The electronic document sharing system 100 can be provided using any suitable processor-based device or system, such as a personal computer, laptop, server, mainframe, or a collection (e.g., network) of multiple computers, for example. The electronic document sharing system 100 can include one or more processors 112 and one or more computer memory units 114. For convenience, only one processor 112 and only one memory unit 114 are shown in FIG. 1. The processor 112 can execute software instructions stored on the memory unit 114. The processor 112 can be implemented as an integrated circuit (IC) having one or multiple cores. The memory 114 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 114 can store executable software and data for an E-signing engine 116. When the processor 112 of the electronic document sharing system 100 executes the software of the E-signing engine 116, the processor 112 can be caused to perform the various operations of the electronic document sharing system 100, such as facilitate the E-Signing of electronic documents. Data used by the E-signing engine 116 can be from various sources, such as a data store 118, which can be an electronic computer database, for example. The data stored in the data store 118 can be stored in a non-volatile computer memory, such as a hard disk drive, a read only memory (e.g., a ROM IC), or other types of non-volatile memory. Also, the data of the data store 118 can be stored on a remote electronic computer system, for example.

The electronic document sharing system 100 can be in communication with user devices 130A-N via an electronic communications network 132. The communications network 132 can include a number of computer and/or data networks, including the Internet, LANs, WANs, GPRS networks, etc., and can comprise wired and/or wireless communication links. The user devices 130A-N that communicate with the electronic document sharing system 100 can be any type of client device suitable for communication over the network 132, such as a personal computer, a laptop computer, a tablet computer, or a netbook computer, for example. In some example embodiments, a user can communicate with the network 132 via a device 130 that is a combination handheld computer and mobile telephone, sometimes referred to as a smart phone. It can be appreciated that while certain embodiments can be described with users communicating via a smart phone or laptop by way of example, the communication can be implemented using other types of user equipment or wireless computing devices such as a mobile telephone, personal digital assistant (PDA), combination mobile telephone/PDA, handheld device, mobile unit, subscriber station, game device, messaging device, media player or other suitable mobile communications devices.

The user devices 130A-N can provide a variety of applications for allowing a user to accomplish one or more specific tasks using the electronic document sharing system 100. Applications can include, without limitation, a web browser application (e.g., INTERNET EXPLORER, MOZILLA, FIREFOX, SAFARI, OPERA, NETSCAPE NAVIGATOR) telephonic application (e.g., cellular, VoIP, PTT), networking application, messaging application (e.g., e-mail, IM, SMS, MMS, BLACKBERRY Messenger), contacts application, calendar application and so forth. The user device 130 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a MICROSOFT OS, APPLE OS, UNIX OS, LINUX OS, and others.

In general, an application, such as a web browsing application or other specialized application, can provide a user interface to communicate information between the electronic document sharing system 100 and the users via the user devices 130A-N. The user devices 130A-N can include various components for interacting with the application such as a display for presenting the user interface and a keypad for inputting data and/or commands. The user devices 130A-N can include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth. Through the interface, the users can interact with the electronic document sharing system 100 (e.g., to share content, to review content, to perform actions related to the content, and so forth).

The applications can include or be implemented as executable computer program instructions stored on computer-readable storage media such as volatile or non-volatile memory capable of being retrieved and executed by a processor to provide operations for the user devices 130A-N. The memory can also store various databases and/or other types of data structures (e.g., arrays, tiles, tables, records) for storing data for use by the processor and/or other elements of the user devices 130A-N.

As shown in FIE 1, the electronic document sharing system 100 can include several computer servers and databases. For example, the electronic document sharing system 100 can include one or more web servers (e.g., 122) and application servers (e.g., 126). For convenience, only one web server 122 and one application server 126 are shown in FIG. 1, although it should be recognized that the invention is not so limited. The servers 122. 126 can comprise processors (e.g., CPUs), memory units (e.g., RAM, ROM), non-volatile storage systems (e.g., hard disk drive systems), etc.

The web server 122 can provide a graphical web user interface through which users of the system can interact with the electronic document sharing system 100. The web server 122 can accept requests, such as HTTP requests, from clients (such as web browsers on the user devices 130A-N), and serve the clients responses, such as HTTP responses, along with optional data content, such as web pages (e.g., HTML documents) and linked objects (such as images, etc.).

The application server 126 can provide a user interface for users who do not communicate with the electronic document sharing system 100 using a web browser. Such users can have special software installed on their user devices 130A-N that allows them to communicate with the application server 126 via the network 132. Such software can be downloaded, for example, from the electronic document sharing system 100, or other software application provider, over the network to such user devices 130A-N.

Although FIG. 1 depicts a limited number of elements for purposes of illustration, it can be appreciated that the electronic document sharing system 100 can include more or less elements as well as other types of elements in accordance with the described embodiments. Elements of the electronic document sharing system 100 can include physical or logical entities for communicating information implemented as hardware components (e.g., computing devices, processors, logic devices), executable computer program instructions (e.g., firmware, software) to be executed by various hardware components, or combination thereof, as desired for a given set of design parameters or performance constraints.

The types or roles of Users A-N shown in FIG. 1 that interact with the electronic document sharing system 100 can vary. The type of user can depend, for example, on the type of transaction or underlying event that connects the Users A-N. By way of example, for a real estate transaction, the Users A-N can include one or more lenders, one or more real estate agents, one or more buyers, and one or more sellers. In accordance with the systems and methods described herein one or more of the Users A-N can E-Sign a plurality of signature fields, which can include initial fields, using interactions described in more detail below. In certain embodiments, one of the Users A-N can interact with electronic documents to flag, tag, or otherwise identify portions of the document that a user should E-Sign.

Figure 2:
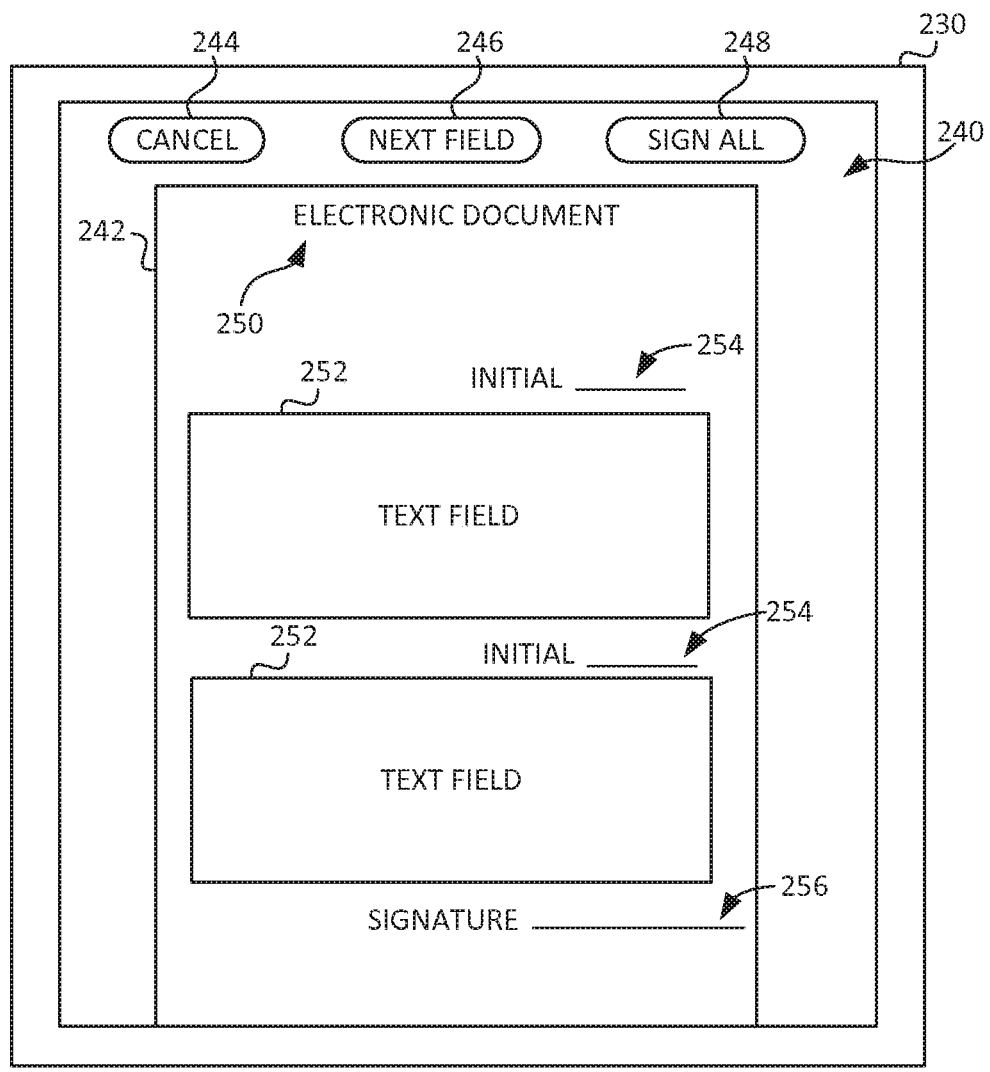
FIG. 2 depicts an example user device comprising a graphical display screen displaying an electronic document.

FIG. 2 depicts an example user device 230 comprising a graphical display screen 240. As provided above, the user device 230 can be any suitable device, such as a laptop computer, tablet computer, smartphone, and so forth. An electronic document 242 is shown displayed on the graphical display screen 240. The electronic document 242 comprises a title 250 and text fields 252. As is to be readily apparent, the particular content of the electronic document 242 will vary based on implementation parameters. The electronic document is shown having a plurality of fields for receiving input from a user, namely initial fields 254 and signature field 256 (sometimes referred to herein collectively as "signature fields"). The illustrated embodiment also comprises various commands, shown as graphical buttons labeled "cancel" 244, "next field" 246, and "sign all" 248. As FIG. 2 is simplified view of an example user interface, other embodiments can utilize a more comprehensive command toolbar. Other formats to offer the various functionality can be used in other embodiments, such as drop down menus, icons, pop-up menus, as should be apparent to those skilled in the art.

Figure 3:
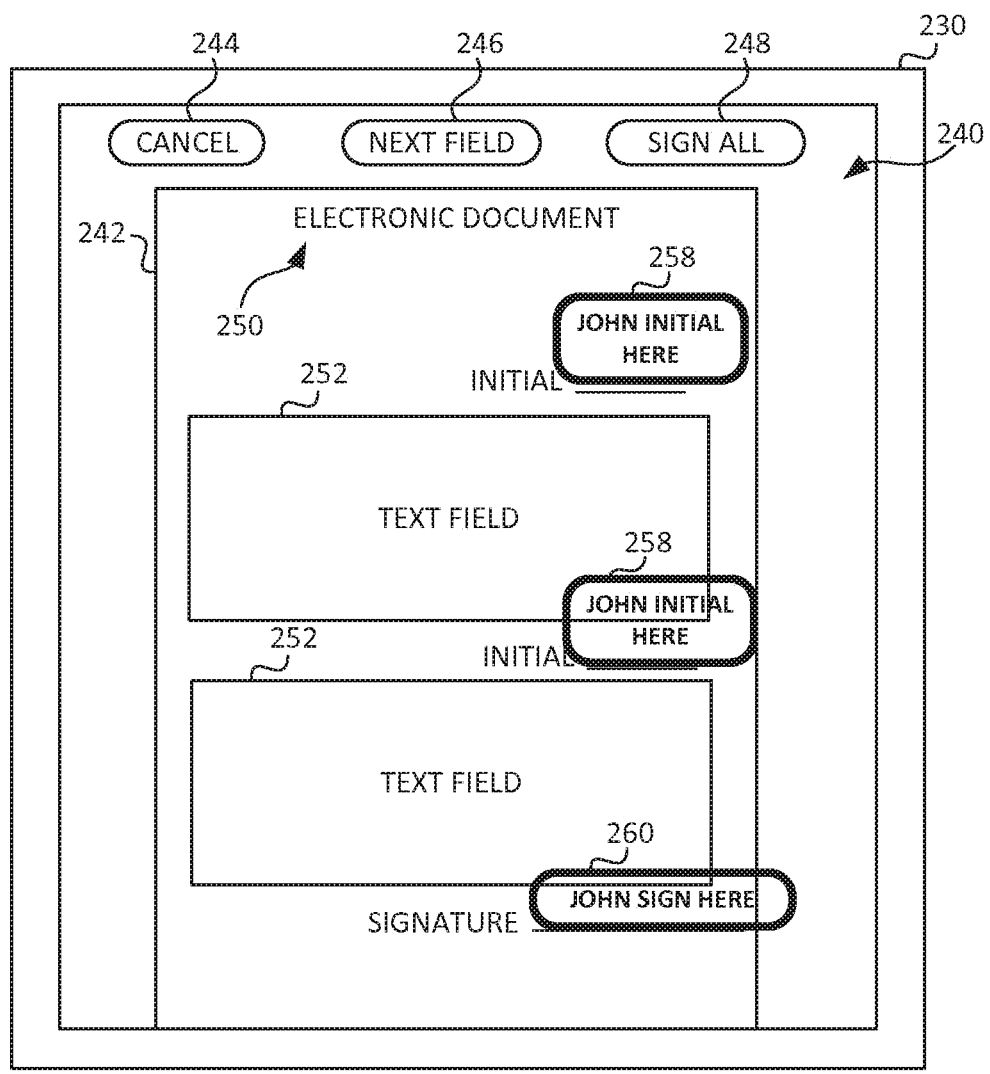
FIG. 3 depicts an electronic document that includes visual indicia of various signature fields within the document.

FIG. 3 depicts the electronic document 242 that includes visual indicia of the various signature fields within the document. In the illustrated embodiment, two initial visual indicia 258 are shown and one signature visual indicia 260 is shown. The initial visual indicia 258 generally align with the initial fields 254 and the signature visual indicia 260 generally aligns with the signature field 256. The visual indicia of the various signature fields can be added to, or at least visually placed on, the electronic document 242 using any number of techniques. In one embodiment, the electronic document sharing system 100 determines the type of information sought by the electronic document 242, such as by parsing through various fields associated with the electronic document 242. For example, in some embodiments, the electronic document 242 is a combination of an image layer and a data layer. The data layer can comprise a plurality of fields, such as initial fields and signature fields. The electronic document sharing system 100 can parse these fields and display the appropriate visual indicia to inform the user of the user device 230 as to where an E-Signature should be added to the document. In other embodiments, another User A-N can interact with the electronic document 242 to add the visual indicia in the appropriate places. In a mortgage closing context, a buyer's agent, loan officer, or other party, can step through the various documents in the electronic closing package and tag, or otherwise denote, the places on each document where a party needs to sign and associate that placment information with the electronic document.

Figure 4:
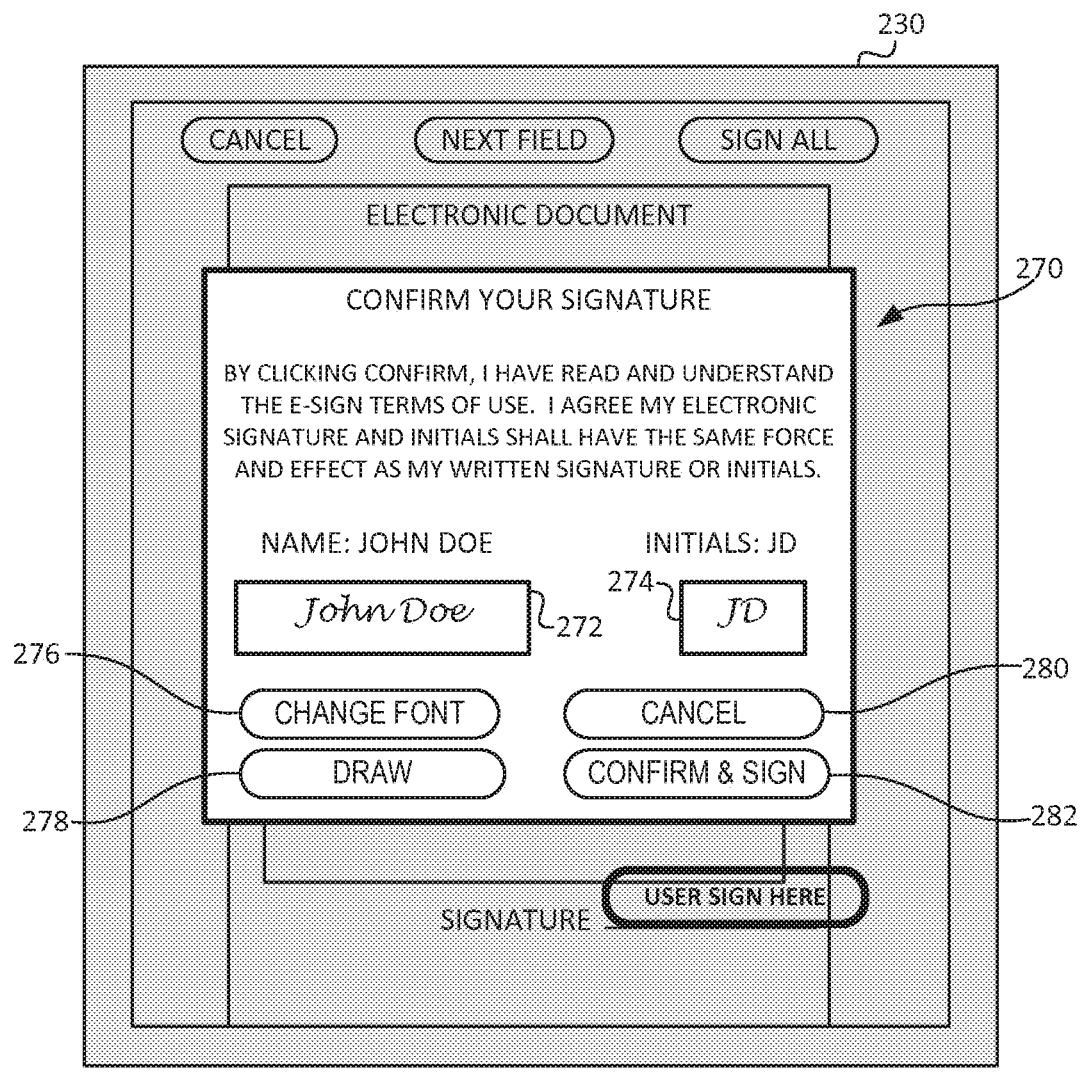
FIG. 4 depicts an example pop-up display that can be displayed to a user prior to completing a signature process.

Once a user has reviewed the electronic document 242 and desires to E-sign all the places indicated by the visual indicia, the "sign all" button 248 (or suitable type of interaction) can be selected to initiate the signing process. In other words, by selecting the "sign all" button 248, the user can effectively place their initials in every initial field 254 and their signature in the signature field 256. FIG. 4 depicts an example pop-up display 270 that can be displayed to the user prior to completing the signature process. Generally, the pop-up display 270 can be used to confirm the user understand various consequences of signing the document, or display any other information to the user. In some embodiments, the pop-up display 270 includes a signature window 272 and an initial window 274 that display an image of the user's signature and initials, respectively. These images can be the same images that will be inserted into the electronic document 242 in the locations identified by the initial visual indicia 258 and the signature visual indicia 260.

A user can select a "change font" button 276 to select a different lettering style for their name. In certain embodiments, the user can select a "draw" button 278 and then manually draw their signature using a stylus, a mouse, their finger, or other input means. In such cases, the drawn signature can be stored by the electronic document sharing system 100 and inserted into the electronic document 242 in the locations identified by the initial visual indicia 258 and the signature visual indicia 260. When a user selects the "cancel" button 280 the signature process can be aborted. Finally, when the user selects the "confirm & sign" button 282, the images in the signature window 272 and an initial window 274 can be populated into, or otherwise associated with, the corresponding fields of the electronic document 242. It is noted that while FIG. 4 displays graphical buttons, any suitable type of control functionality can be used without departing from the scope of the present disclosure, such as radio buttons, drop down menus, pop-up menus, and so forth.

Figure 5:
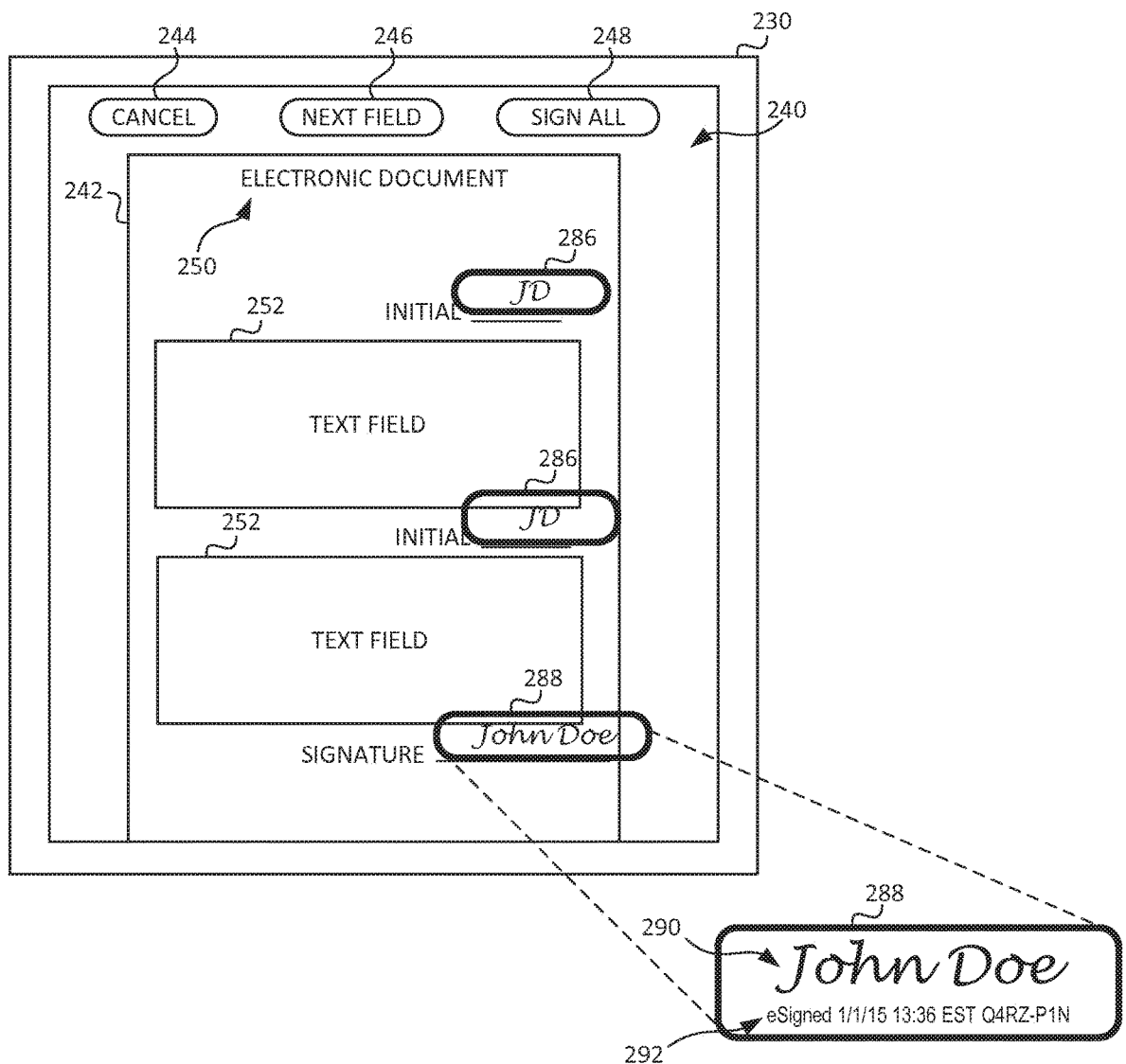
FIG. 5 depicts an example electronic form subsequent to the population of initial fields and signature field with E-Signatures.

FIG. 5 depicts the electronic form 242 subsequent to the initial fields 254 and signature field 256 being populated with E-Signatures (shown as user initials 286 and user signature 288). Each E-Signature 290 associated with the electronic form 242 can include time/date stamp indicia 292, as well as a unique identification code for authentication purposes.

Figure 6:
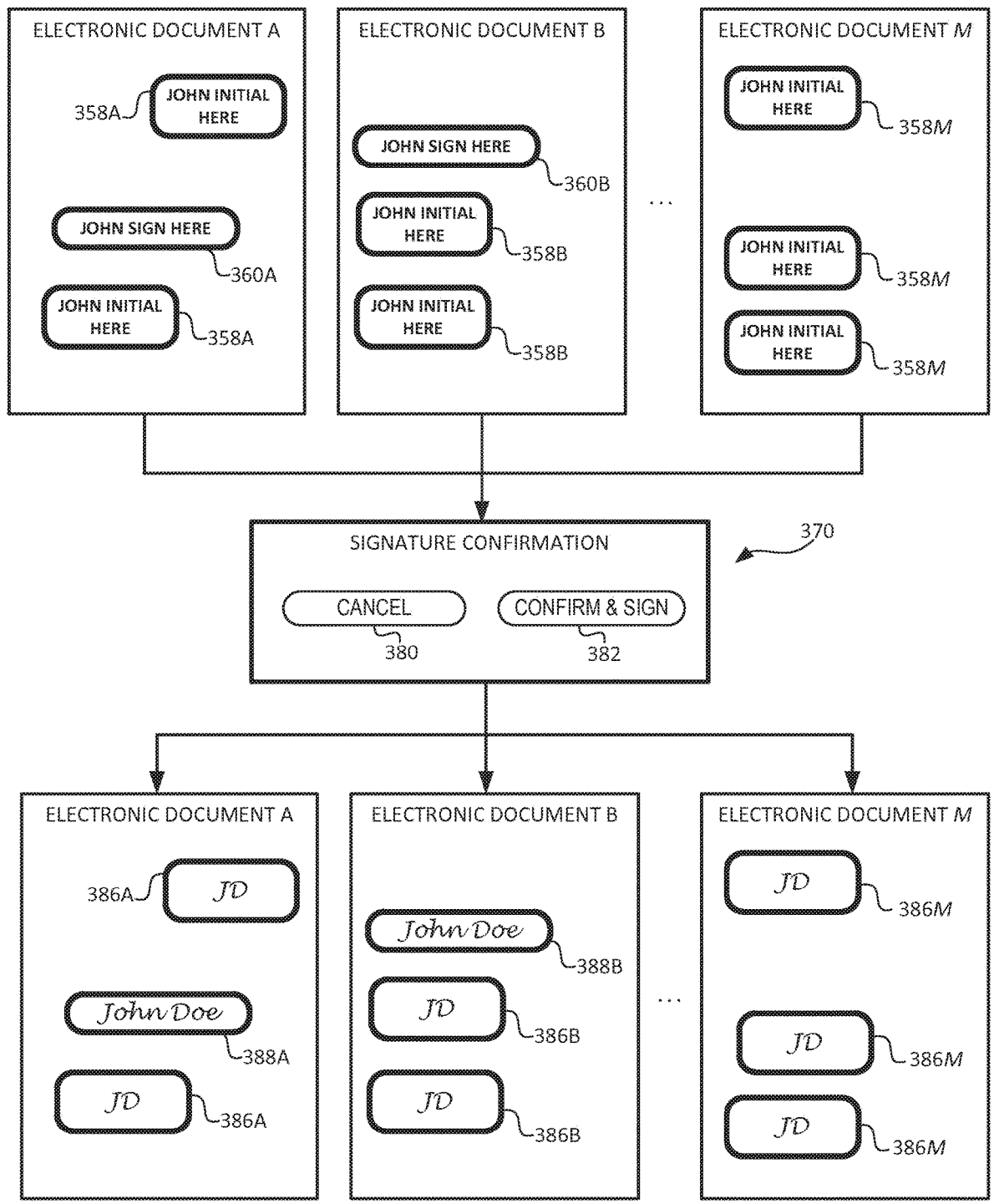
FIG. 6 depicts an example E-Signature flow for a plurality of electronic documents.

While FIGS. 2-5 describe an embodiment using a single electronic document 242, this disclosure is not so limited. In fact, the systems and methods can be used to allow a user to populate a large number of E-Signatures across numerous documents, without requiring the user to individually place their E-Signature in each individual field. FIG. 6 depicts an example E-Signature flow for a plurality of electronic documents A-M. Each electronic document A-M comprises visual indicia 358 (e.g., 358A, 358B, 358M) and signature visual indicia 360 (e.g., 360A, 360B) to indicate where E-Signatures of the user is needed. Through interactions with the electronic document sharing system 100, a user can review each electronic document A-M, if the user desires. Using a signature confirmation menu 370, the user can decide to cancel the operation using button 380 or "confirm and sign" the electronic documents using button 382. When the user selects the "confirm and sign" button 382, the electronic documents A-M are populated with the initials 386 (e.g., 386A, 386B, 3860) and the signatures 388 (e.g., 388A, 388B) of the user. As is to be appreciated, the initials and signatures added to the electronic documents A-M can comply with various electronic signature state and federal regulation. Details regarding the requirements for E-Signatures are known in the art. The electronic documents A-M, which include the E-Signatures, can then be used in the workflow facilitated by the electronic document sharing system 100. In the context of a lending scenario, the E-Signed documents can be provided to the lending institution, for example. In the context of a real estate negotiation, the E-Signed documents can be provided to the opposing side.

Figure 7:
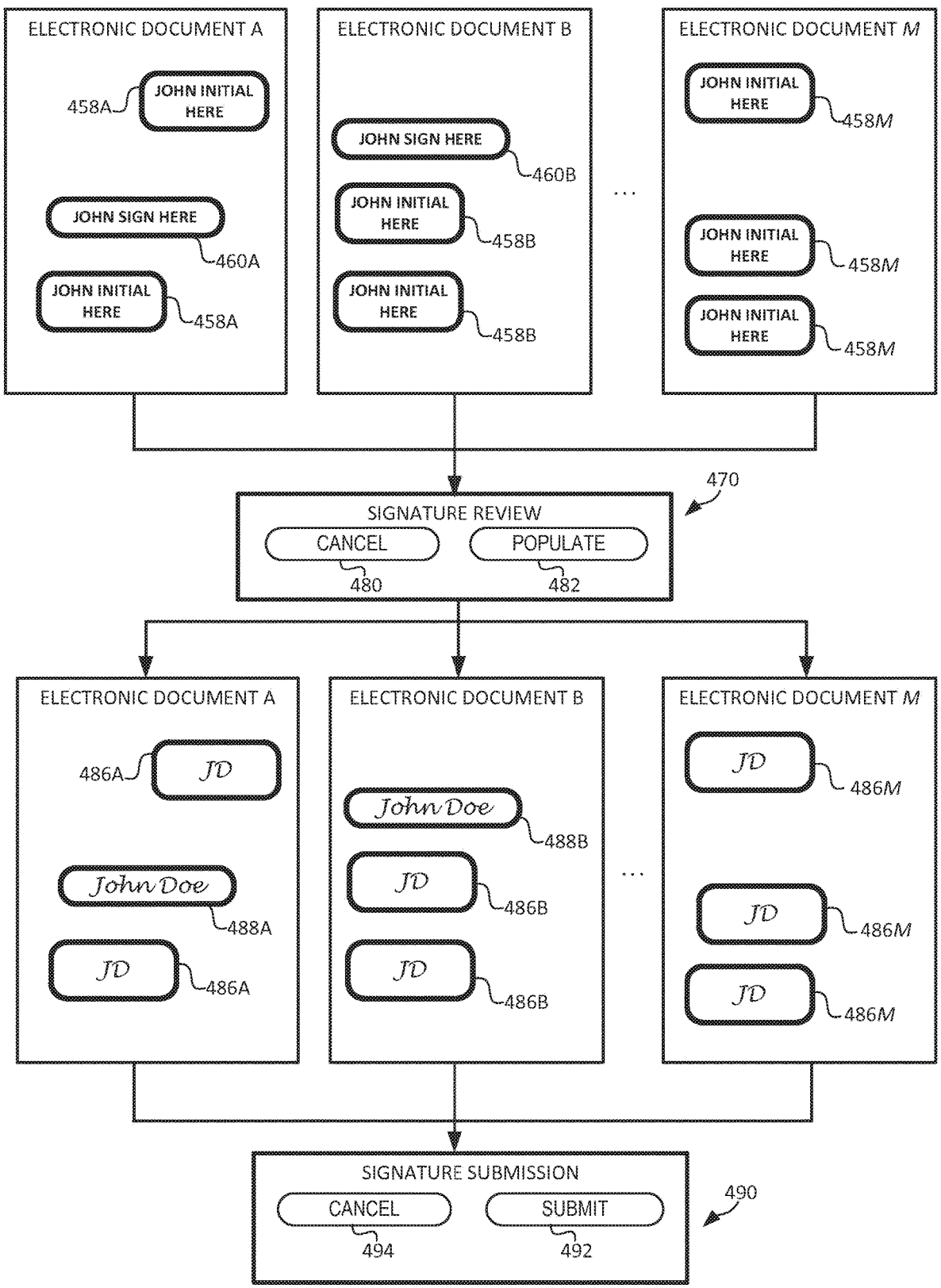
FIG. 7 depicts an example collective E-Signature flow for a plurality of electronic documents

In some embodiments, a multi-layered E-Signature approval process can be used. FIG. 7 depicts an example collective E-Signature flow for a plurality of electronic documents A-M. Each electronic document A-M comprises visual indicia 458 (e.g., 458A, 458B, 458M) are shown and signature visual indicia 460 (e.g., 460A, 460B) to indicate where E-Signatures of the user is needed. Through interactions with the electronic document sharing system 100, a user can review each electronic document A-M. Using a signature confirmation menu 470, the user can decide to cancel the operation using button 480 or "populate" the electronic documents using button 482. When the user selects the "populate" button 382, the electronic documents A-M are populated with the initials 486 (e.g., 486A, 486B, 486C) and the signatures 488 (e.g., 488A, 488B) of the users. Prior to submitting the E-Signed documents for processing, the user can review (or be required to review) the electronic documents. Once the initials 486 and the signatures 488 have been reviewed by the user, a menu 490 can provide the user with the option to cancel the submission using button 494 or to submit the E-Signed documents using the "submit" button 292 Once reviewed and submitted, the electronic documents A-M, which include the E-Signatures, can then be used in the workflow facilitated by the electronic document sharing system 100.

The above descriptions of various components and methods are intended to illustrate specific examples and describe certain ways of making and using the systems disclosed and described here. These descriptions are neither intended to be nor should be taken as an exhaustive list of the possible ways in which these systems and modules can be made and used. A number of modifications, including substitutions of systems and modules between or among examples and variations among combinations can be made. Those modifications and variations should be apparent to those of ordinary skill in this area after having read this document.

What is claimed is:

1. An electronic document sharing computing system comprising a processor and a computer-readable medium storing contents that, when executed by the processor, cause the processor to:
cause a single electronic document from among a plurality of documents to be presented to a single user, from among a plurality of users, wherein the single electronic document is not a collection of documents, and wherein the single electronic document comprises:
two or more signature fields for receiving input from the single user, and
for each of at least two of the signature fields for receiving input from the single user, a visual indicium presented proximate to the signature field that indicates that the signature field is intended for the single user's signature, wherein each of the visual indicia identifies the single user;
cause to be displayed a pop-up display, the pop-up display including a first button, a change font button, a draw button, and a signature window, the signature window of the pop-up display including an image of an electronic signature of the single user;
receive input from the single user modifying at least a portion of the electronic signature of the single user;
store the modified electronic signature of the single user; and
in response to receiving a selection of the first button, populate each of multiple signature fields of a single page of the single electronic document with the modified electronic signature of the single user so that each of the multiple signature fields of the single page of the single electronic document is populated with the modified electronic signature of the single user.

2. The electronic document sharing computing system of claim 1 wherein the single electronic document has at least one associated image layer and at least one associated data layer, wherein each of the two or more signature fields is stored in the at least one associated data layer.

3. The electronic document sharing computing system of claim 1 wherein the electronic signature of the single user comprises any of a full name of the single user and at least one initial of the user.

4. The electronic document sharing computing system of claim 1 wherein the single electronic document is one document of a collection of documents and wherein signature fields of multiple documents of the collection of documents are populated with the electronic signature of the single user in response to receiving a selection of a single selectable signature command element.

5. The electronic document sharing computing system of claim 1 wherein the single electronic document comprises a plurality of pages, such that signature fields of multiple pages of the single electronic document are populated with the electronic signature of the single user in response to receiving a selection of a single selectable signature command element.

6. The electronic document sharing computing system of claim 1 wherein a single selectable signature command element is selectable using a single input command.

7. The electronic document sharing computing system of claim 6 wherein the single input command is a selection of a graphical icon.

8. The electronic document sharing computing system of claim 1 wherein the stored contents, when executed by the processor, further cause the processor to:
in response to receiving a selection of a single selectable signature command element, remove, from the single electronic document, at least one visual indicia that indicates that a signature field is intended for the single user's signature.

9. The electronic document sharing computing system of claim 1 wherein the stored contents, when executed by the processor, further cause the processor to:
in response to receiving a selection of a single selectable signature command element,
for each user selected from among the plurality of users,
populate, with an electronic signature of the selected user, at least one signature field of the single electronic document; and
prior to submitting the single electronic document, require that the selected user review the single electronic document.

10. The electronic document sharing computing system of claim 1, wherein the contents, when executed by the processor, further cause the processor to:
retrieve the stored modified electronic signature of the single user;
cause to be displayed a pop-up display that includes an image of the retrieved modified electronic signature of the single user.

11. A computer-readable hardware device having contents adapted to cause a computer system to perform a method, the method comprising:
storing information configured to cause one or more signature fields for receiving input from a single user, from among a plurality of users, to be presented in association with a presentation of a single electronic document from among a plurality of documents, wherein the single electronic document is not a collection of documents,
and wherein the single electronic document comprises:
two or more signature fields for receiving input from the single user, and
for each of at least two of the signature fields for receiving input from the single user, a visual indicium presented proximate to the signature field that indicates that the signature field is intended for the single user's signature, wherein each of the visual indicia identified the single user;
storing information configured to cause one or more visual indicia to be presented proximate to at least one presented signature field;
causing to be displayed a pop-up display, the pop-up display including a first button, a change font button, a draw button, and a signature window, the signature window of the pop-up display including a previously-stored image of an electronic signature of the single user;
causing to be displayed at least two visual indicia identifying the single user;
receiving input from the single user modifying at least a portion of the electronic signature of the single user;
storing the modified electronic signature of the single user; and
in response to receiving a selection of the first button, populating each of multiple signature fields of the single electronic document with the modified electronic signature of the single user so that each of the multiple signature fields of the single electronic document is populated with the modified electronic signature of the single user; and causing the displayed at least two visual indicia identifying the single user to be removed.

12. The computer-readable hardware device of claim 11 wherein the electronic signature of the single user comprises any of a full name of the single user and at least one initial of the single user.

13. The computer-readable hardware device of claim 11 wherein a single selectable signature command element is selectable using a single input command.

14. The computer-readable hardware device of claim 13 wherein the single input command is a single mouse click.

15. The computer-readable hardware device of claim 11, the method further comprising:
in response to receiving a selection of a single selectable signature command element, removing information configured to cause at least one visual indicium to be presented proximate to at least one presented signature field.

16. The computer-readable hardware device of claim 11, wherein the single electronic document is one document of a collection of documents and wherein signature fields of multiple documents of the collection of documents are populated with the electronic signature of the single user in response to receiving the selection of the single selectable signature command element.

17. The computer-readable hardware device of claim 11 wherein the input from the single user modifying at least a portion of the electronic signature of the single user includes a selection of a font.

18. A method, performed by a computing system having a memory and a processor, for sharing an electronic document, the method comprising:
causing a single electronic document from among a plurality of documents to be presented to a single user, from among a plurality of users, wherein the single electronic document is not a collection of documents, and wherein the single electronic document comprises:
two or more signature fields for receiving input from the single user, and
for each of at least two of the signature fields for receiving input from the single user, a visual indicium presented proximate to the signature field that indicates that the signature field is intended for the single user's signature, wherein each of the visual indicia identifies the single user;
receiving a selection of a single selectable signature command element from among one or more selectable signature command elements;
causing to be displayed a pop-up display, the pop-up display including a first button, a change font button, a draw button, and a signature window, the signature window of the pop-up display including a previously-stored image of an electronic signature of the single user;
receiving input from the single user modifying at least a portion of the electronic signature of the single user;
storing the modified electronic signature of the single user; and
after receiving a selection of the first button,
populating each of two or more signature fields of the single electronic document with the modified electronic signature of the single user so that each of the two or more signature fields of the single electronic document is populated with the modified electronic signature of the single user.

19. The method of claim 18 wherein the electronic signature of the single user comprises any of a full name of the single user and at least one initial of the single user.

20. The method of claim 18 wherein the single electronic document has at least one associated image layer and at least one associated data layer.

21. The method of claim 18 wherein the electronic single document comprises a plurality of pages, such that signature fields of multiple pages of the single electronic document are populated with the electronic signature of the user in response to receiving the selection of the single selectable signature command element.

22. The method of claim 18, further comprising:
causing the single electronic document to be presented to a second single user,
wherein the presented single electronic document further comprises:
two or more signature fields for receiving input from the second single user, and
for each of at least two of the signature fields for receiving input from the second single user, a visual indicium presented proximate to the signature field for receiving input from the second single user that indicates that the signature field for receiving input from the second user is intended for the second single user's signature; and
in response to receiving a selection of a second single selectable signature command element,
populating, with an electronic signature of the second single user, multiple signature fields for receiving input from the second single user for which a visual indicium is presented so that each of the populated multiple signature fields for receiving input from the second single user is populated with the electronic signature of the second single user.

23. The method of claim 18, further comprising:
receiving, from a first party, other than the single user, placement information for each place in the single electronic document where the single user is to sign the single electronic document; and
associating the received placement information with the single electronic document.

24. The method of claim 18, further comprising:
after populating each of two or more signature fields of the single electronic document with the modified electronic signature of the single user so that each of the two or more signature fields of the single electronic document is populated with the modified electronic signature of the single user, revoking authorization of the single user to make further changes to the single electronic document and authorizing a second user from among the plurality of users to make changes to the single electronic document.

* * * * *

UNITED STATES PATENT AND TRADEMARK OFFICE
CERTIFICATE OF CORRECTION

PATENT NO. : 10,976,885 B2
APPLICATION NO. : 15/436617
DATED : April 13, 2021
INVENTOR(S) : Allison et al.

Page 1 of 1

It is certified that error appears in the above-identified patent and that said Letters Patent is hereby corrected as shown below:

In the Specification

In Column 1, Line 54, after "documents" insert -- . --.

In Column 4, Line 13, delete "y ems" and insert -- systems --, therefor.

In Column 5, Line 17, delete "telephonic" and insert -- telephone --, therefor.

In Column 5, Line 54, delete "tiles," and insert -- files, --, therefor.

In Column 5, Line 57, delete "FIE" and insert -- FIG. --, therefor.

In Column 5, Line 64, delete "122. 126" and insert -- 122, 126 --, therefor.

In Column 7, Line 26, delete "placment" and insert -- placement --, therefor.

In Column 8, Line 23, delete "3860)" and insert -- 386C) --, therefor.

In the Claims

In Column 10, Line 47, in Claim 11, delete "identified" and insert -- identifies --, therefor.

In Column 11, Line 3, in Claim 11, delete "user;" and insert -- user, --, therefor.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*